(12) United States Patent
Wilding (10) Patent No.: US 6,934,562 B1
(45) Date of Patent: Aug. 23, 2005

(54) SYSTEM FOR COUPLING A MOBILE RADIO SERVICE BASE STATION TO AN ANTENNA

(75) Inventor: Leslie James Wilding, Winston, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/416,007

(22) Filed: Oct. 8, 1999

(51) Int. Cl.$^7$ .............................................. H04M 1/00
(52) U.S. Cl. ...................... 455/562.1; 455/78; 455/561; 375/136
(58) Field of Search .............................. 455/562.1, 561, 455/73, 78, 83, 82, 562; 375/132, 136, 367

(56) References Cited

U.S. PATENT DOCUMENTS

| | | | | |
|---|---|---|---|---|
| 3,636,452 A | * | 1/1972 | Nuding | 455/17 |
| 3,865,990 A | * | 2/1975 | Kuenemund | 370/339 |
| 3,931,575 A | * | 1/1976 | Amoroso, Jr. | 455/75 |
| 4,161,694 A | * | 7/1979 | Weber et al. | 370/315 |
| 4,211,894 A | * | 7/1980 | Watanabe et al. | 370/339 |
| 4,792,939 A | * | 12/1988 | Hikita et al. | 370/277 |
| 5,659,886 A | * | 8/1997 | Taira et al. | 455/81 |
| 5,701,595 A | * | 12/1997 | Green, Jr. | 455/83 |
| 6,049,562 A | * | 4/2000 | Dekker | 375/136 |
| 6,304,214 B1 | * | 10/2001 | Aiken et al. | 342/362 |
| 6,314,305 B1 | * | 11/2001 | Solondz et al. | 455/562 |

* cited by examiner

Primary Examiner—Vivian Chin
Assistant Examiner—Lewis West
(74) Attorney, Agent, or Firm—Cantor Colburn LLP (57) ABSTRACT

Coupling one or more receivers and transmitters of a base station to an antenna in a cellular-like commercial mobile radio services (CMRS) system. The antenna is coupled to a receive path and to a transmit path via a circular. Each receive path comprise one or more receive branch networks, whereas each transmit path comprise one or more transmit branch networks. A transmitter is coupled to the transmit path via a transmit branch network, while a receiver is coupled to the receive path via a receive branch network. Each transmit and receive branch network typically comprises a filter and ferromagnetic circulator. A transmitter can originate a transmit signal, which is processed by a transmit branch network coupled between the transmitter and a node of the transmit path. This transmit branch network can pass this processed transmit signal with the output signal of other transmitter branch networks in the upstream direction of the transmit path for forwarding to antenna signals received by the antenna are coupled to various receiver branch networks that operate to separate and extract the signals for corresponding receivers. Each receive branch network is coupled between a corresponding receiver and a node of the receive path. A receive branch network can filter the received signal for processing by a corresponding receiver, while also passing received signals to the downstream portion of the receive path.

15 Claims, 5 Drawing Sheets

FIG. 5A — Typical Bandpass Filter (315) Characteristics as Seen by the Circulator

FIG. 5B

FIG. 5C — Filtered Output (Rx 3)

FIG. 5D — Typical Output Response–Port 303 (Return Loss Response of the Filter)

FIG. 5E

SYSTEM FOR COUPLING A MOBILE RADIO SERVICE BASE STATION TO AN ANTENNA

FIELD OF THE INVENTION

The present invention is generally directed to the coupling of one or more transmitters and receivers of a base station to an antenna. More specifically, the present invention is directed to a coupling system comprising multiple receive and transmit branch networks for coupling one or more transmitters and receivers of a base station in a commercial mobile radio service (CMRS) system.

BACKGROUND OF THE INVENTION

Personal Communication Service (PCS) is largely an enhancement of cellular radio telephone service which, in turn, is based on early two-way radio systems. In the simplest configuration, a receiver and transmitter share a common base station antenna for receiving and transmitting signals to and from mobile stations. Typically, the receiver and transmitter each use a separate frequency range for sending and receiving information. By grouping multiple pairs of frequency ranges, called frequency blocks, multiple mobile stations can share the same base station antenna infrastructure and provide advantages to the system operator.

One or more transmitters/receivers may be coupled to the antenna to accommodate different frequency blocks or different frequency ranges within a block. Current coupling implementations use components functioning as couplers, splitters, and duplexors to couple the antenna with the receiver and transmitter. Couplers typically combine two separate signals from two sources into one output source. In contrast, splitters accept one input signal and provide two nearly identical signals on separate outputs. Duplexors allow an input and an output signal on a common source to be separated at a common point into separate input and output channels.

Figure 1:
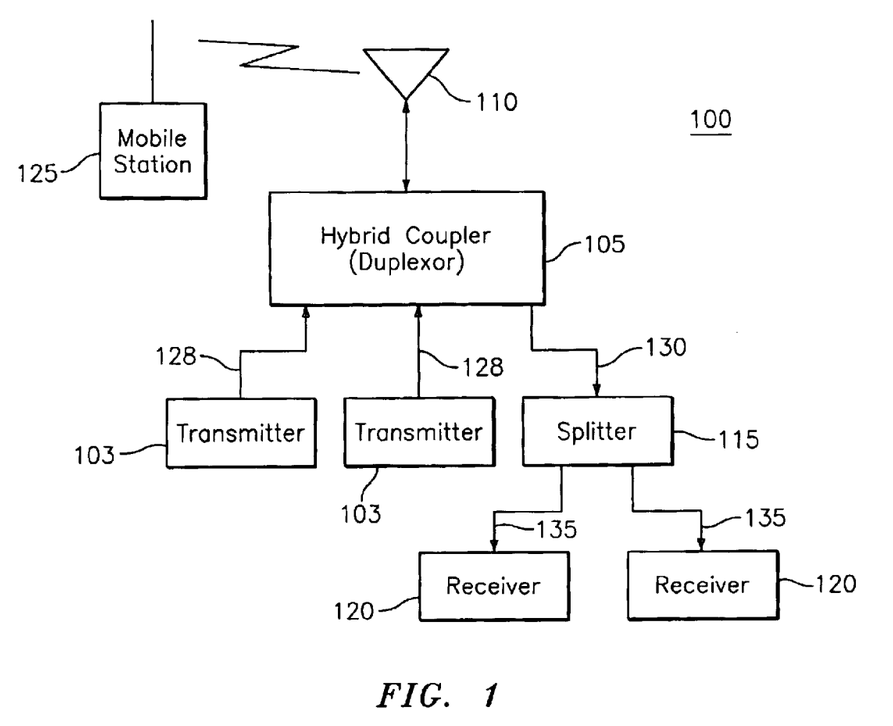
FIG. 1 is a block diagram of the components of a prior coupling system for coupling transmitters and receivers to an antenna in a PCS system.

FIG. 1 is a functional block diagram that illustrates a typical prior coupling system 100 for two transmitters and two receivers sharing a common antenna in a commercial mobile radio service (CMRS) system. Referring now to FIG. 1, an antenna 110 receives electromagnetic signals originating from mobile stations 125 and transmits such signals to the mobile stations. A hybrid coupler/duplexor 105 functions both as a coupler for combining signals from multiple transmitters 103 and as a duplexor to separate received signals 130 from transmit signals 128.

The received signals from antenna 110 are output to the coupler/duplexor 105, separated from the transmit signals 128, and sent to a splitter 115. The splitter 115 divides each received signal 130 output by the duplexor 105, thereby providing two nearly identical signals 135 to receivers 120. Because each output signal 135 contains all frequencies of the electromagnetic signals received by the antenna 110, each receiver 120 typically filters unwanted signals. The transmit signals 128 originate from transmitters 103 and are combined by the coupler/duplexor 105 for transmission by the antenna 110.

The duplexor function of the coupler/duplexor 105 separates the received signals from the transmit signals. Duplexors are traditionally assembled by connecting mechanically-tuned cavities together in a bandpass, band reject, or hybrid configuration. All duplexors must exhibit certain characteristics if optimum system performance is to be achieved. As shown in Table 1, these typical duplexor characteristics include:

TABLE 1

| | |
|---|---|
| (1) | Operate in the specified transmit and receive frequency bands. |
| (2) | Handle total transmit power. |
| (3) | Provide adequate rejection of transmitter noise in the receive band. |
| (4) | Provide adequate isolation between the transmitter port and the receiver port to prevent receiver desensitization. |
| (5) | Provide minimum insertion loss, which is dependent upon the duplexor design and the frequency separation between the transmit and receive bands. |

The coupler function of the coupler/duplexor 105 is also usually constructed of mechanically-tuned cavities designed to provide low transmission losses. The splitter 115, on the other hand, is usually constructed with resistive components and has built-in amplifiers to compensate for any additional signal losses.

While the prior coupling system 100 is proven and well known, this coupling system carries the penalty of increased transmission losses as multiple transmitters are added. This addition of transmitters also requires the insertion of multiple couplers, which degrades the signal due to increase thermal noise. Because the components pass wideband signals, they offer no inherent advantages for adjacent signal rejection.

The configuration shown in FIG. 1 is the conventional method of coupling transmitters and receivers in certain CMRS systems, such as AMPS-compatible systems. Because only two licensed cellular carriers are allowed in a given AMPS market, each cellular service provider usually deploys its own antennas and infrastructure. In contrast, PCS regulators allow up to six licensed providers in each PCS market. Because of increased difficulty in obtaining approval for constructing towers in urban areas, PCS providers now often share the same towers for mounting antennas. As the power of the received signal is proportional to the distance between the transmitting and received antenna, co-location leads to one service provider's transmitted signals being received by another provider's antenna. Because of the multitude of providers operating in adjacent frequency blocks, as well as the close physical proximity of antennas, blocking adjacent signals is of greater concern to PCS providers than to cellular providers. Although conventional coupling technology can be used in PCS equipment to couple receivers and transmitters, prior coupling systems do not offer satisfactory signal interference rejection levels and signal to noise ratios for PCS systems. Moreover, the prior coupling systems suffer from increased transmission losses when multiple transmitter elements are added to the typical PCS system implantation.

In view of the foregoing, there is a need for an improved system to couple a transmitter and receiver of a CMRS system, such as a PCS system, to an antenna. The present invention provides a coupling system for CMRS systems that overcomes the disadvantages of the prior art while offering improved interference signal rejection, lower transmission losses, and improved signal-to-noise ratios.

SUMMARY OF THE INVENTION

The present invention provides a system for coupling a base station transmitter and a base station receiver to an antenna in or for a commercial mobile radio service (CMRS) system. The inventive coupling system includes at least a pair of receive branch networks and at least a pair of transmit branch networks. The receive branch networks couple the base receivers to the antenna via the receive path. Each receive branch network is operative to select a frequency range of the receive signals for reception by the base station receiver and to pass the receive signals to the receive branch networks located in the downstream portion of the receive path. The transmit branch networks couple the base transmitters to the antenna via the transmit path. Each transmit branch network is operative to select a frequency range of the transmit signals transmitted by the base transmitter for forwarding to the antenna and to accept all transmit signals forwarded by the transmit branch networks located in the downstream portion of the transmit path.

Each receive branch network typically includes the combination of a circulator and a filter, such as a band-pass filter. The circulator is coupled to the receive path and can pass the receive signals to the filter and to another one of the receive branch networks in the downstream receive path. The filter, which is coupled between the circulator and the base receiver, selects a frequency range or block of the receive signals for reception by the base receiver.

Each transmit branch network typically includes the combination of a circulator and a filter, such as a band-pass filter. The filter, which is coupled between the circulator and the base transmitter, selects a frequency range or block of the transmit signals for eventual transmission by the antenna. The circulator is coupled to the transmit path and can pass the filtered transmit signals to the transmit path for delivery to the antenna. In addition, the circulator can pass transmit signals from the transmit branch networks located in the downstream transmit path to an upstream portion of the transmit path.

DETAILED DESCRIPTION OF THE EXEMPLARY EMBODIMENTS

The present invention is primarily designed for implementation in radio telephony systems, such as cellular-like commercial mobile radio service (CMRS) systems, and provides a coupling system for coupling a transmitter and receiver to an antenna. Advantageously, the coupling system provides lower signal loss and improved rejection of interfering adjacent signals when compared to conventional methods.

Figure 2:
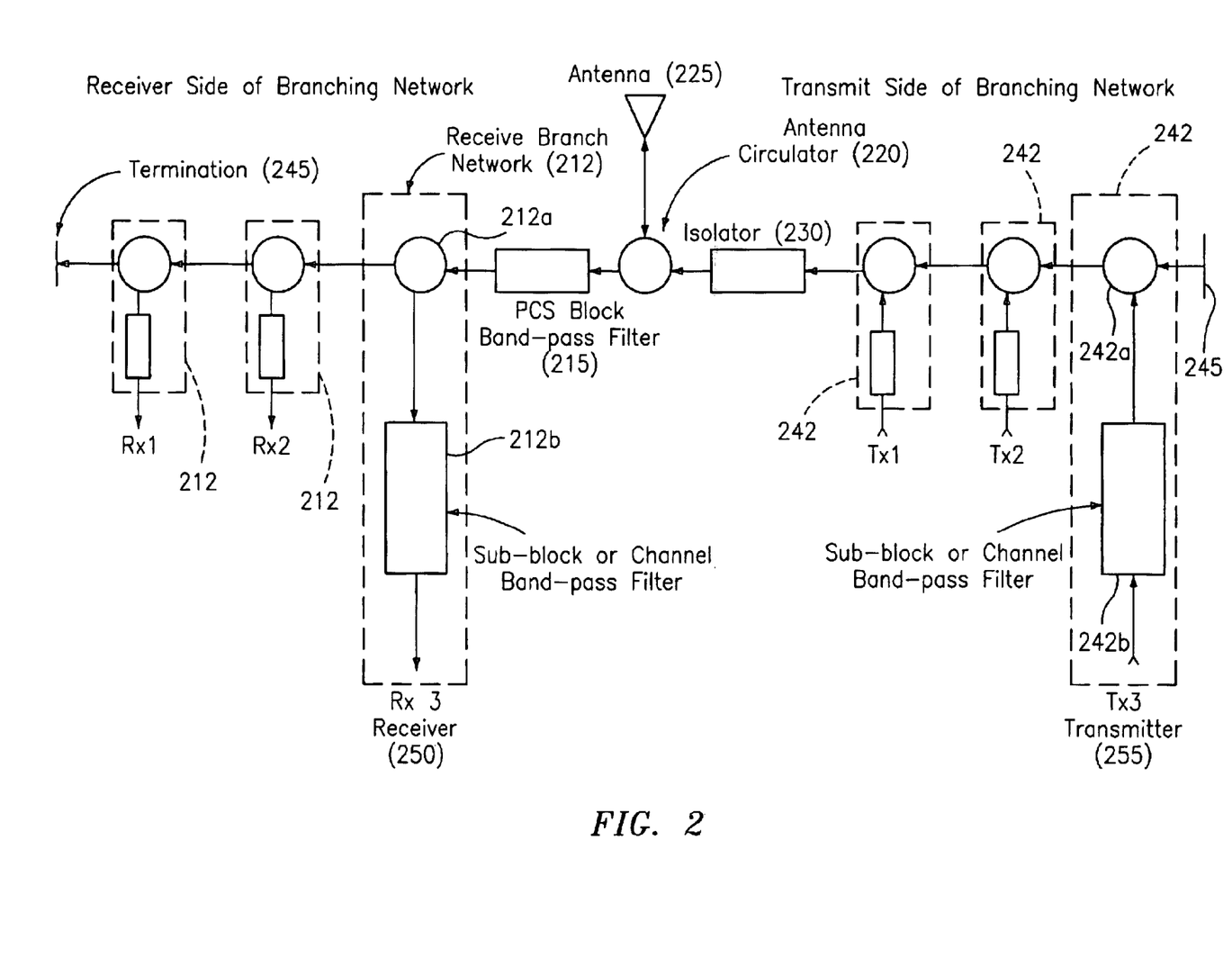
FIG. 2 is a block diagram of the components of a coupling system for coupling transmitters and receivers to an antenna in accordance with an exemplary embodiment of the present invention.

The configuration of an exemplary antenna coupling branch network for a Personal Communications System (PCS) system is depicted in FIG. 2. As radio telephony systems inherently involve two-way communication, the preferred embodiment of this invention will be shown with signal coupling implemented for the same number of transmitters as receiver, i.e., a balanced coupling system. Although the antenna branching network 200 may be utilized for a single transmitter/receiver pair, the preferred embodiment is configured for operation with two or more transmitter/receiver pairs coupled to a common antenna. An alternative exemplary antenna branching network can be implemented with a coupling system for an unequal number of receivers and transmitters, i.e., an unbalanced coupling system.

An exemplary embodiment of the antenna coupling system 200 comprises a balanced number of receive and transmit branch networks 212 and 242, respectively, within the receive and transmit paths. Each receive and transmit branch network 212 and 242 is respectively connected to a receiver 250 and transmitter 255. The branch networks are typically allocated certain frequency ranges or blocks based on the operating ranges of the corresponding receiver or transmitter. Each receive branch network 212 comprises a circulator 212a and a filter 212b. The circulator 212a is connected directly to the receive path, whereas the filter 212b is connected between an output of the circulator 212a and an input to the receiver 250. Similarly, each transmit branch network 242 comprises a circulator 242a and a filter 242b. The circulator 242a is connected directly to the transmit path, whereas the filter 242b is connected between an input of the circulator 242a and an output of the transmitter 255.

A circulator 220, coupled between the receive and transmit paths and to the antenna 225, directs signal flow to and from the antenna. A filter 215 is preferably placed between the circulator 220 and the receive branch networks 212 to prevent undesired transmit-frequency signals from entering the receive path. Similarly, an isolator 230 is preferably placed between the circulator 220 and the transmit branch networks 242 to prevent undesired receive-frequency signals from entering the transmit path. Both the filter 215 and the isolator 230 pass desired signals; the filter passes receive signals to the nodes of the receive branch networks 212, while the isolator passes transmit signals to the circulator 220. Terminators 245 are coupled at the "ends" of the transmit and receive branch paths for the antenna coupling system 200. These termination-type devices serve to terminate each path with an appropriate impedance, while minimizing undesirable signal reflections within the paths of the system 200.

Turning now to a review of the operation of the antenna coupling system 200, each transmitter 255 and receiver 250 is connected to branch networks 242 and 212 in the transmit and receive paths of the antenna coupling system 200. A branch network in either the transmit or the receive path filters the specific frequency range associated with a transmitter or a receiver and allows the signal to be coupled with other signals provided to or from an antenna. For example, multiple branch networks can share an antenna 225, with all receive branches 212 on one side of the configuration forming a receive path and all transmit branches 242 on the other side forming a transmit path. The circulator 220 couples signals to and from the antenna 225 onto the receive and transmit paths of the coupling system 200. The circulator 220 allows transmit signals to be sent from the transmitter 255 to the antenna 225 and signals received from the antenna 225 to be sent to the receive path for reception by the receivers 250.

In the transmit path, the transmit branch networks 242 are preferably connected to the isolator 230 which, in turn, is connected to the antenna circulator 220. The isolator 230 prevents certain signals passed by the antenna 225 or otherwise present in the antenna circulator 220 from being sent to the transmitters 255 in the transmit path. In particular, the isolator 230 can attenuate any signals received by the antenna 225 and prevents their introduction into the transmit branch networks 242. However, the isolator 230 passes transmit signals supplied by the transmit branch networks 242 to the circulator 220 for transmission via the antenna. The isolator 230 is typically implemented as a circulator in which one port is terminated leaving the two other ports for receiving input signals and sending output signals. Any signals received by the input port in the upstream direction of the transmit path are sent by the isolator 230 to the output port, while reverse signals in the downstream direction are attenuated.

In the receive path, the receive branch networks 212 are preferably coupled to the antenna circulator 220 via a filter 215. The filter 215 passes only signals of the frequencies associated with the receivers 250 to the receive branch networks 212. The filter 215 passes all desired signals associated with the frequency ranges of the receivers 250 and attenuates signals originating from the transmit path or other signal frequencies received by antenna 225.

For receive operations, the antenna 225 typically receives electromagnetic signals from one of the mobile radio stations of the CMRS system. The antenna 225 passes the received signals to the antenna circulator 220 which, in turn, sends the received signals to the filter 215. The filter 215, which is coupled to the receive branch networks 212, filters the received signals and outputs filtered signals to the branches in the receive path. Each receive branch network 212 filters the received signals on the receive path based on the frequency range assigned to that branch network. In this manner, each receive branch network outputs a desired signal within a particular frequency range to the corresponding receiver 250. For example, the first receive branch network 212, which is directly connected to the filter 215, separates a signal of a particular frequency range and passes the remaining signals to subsequent receive branches 212 in the downstream portion of the receive path. Each remaining receive branch network 212, in turn, separates a signal of a different frequency range for processing by a corresponding receiver 250. It will be appreciated that unique frequency ranges or blocks are assigned to separate receive branch networks 212 to support the processing of signals within a specific frequency range by a corresponding receiver 250, such as a channelized-type receiver.

For transmit operations, the transmit signal flow is opposite the receive signal flow because the transmit signal originates from the transmitter 255 and passes through a corresponding transmit branch network 242. In turn, the transmit branch network 242 passes the transmit signal to the upstream portion of the transmit path for eventual radiation by the antenna 225. It will be understood that this transmit signal can be coupled or summed with signals of other frequencies output by the remaining transmit branch networks 242. In particular, the transmit signals from all transmit branch networks 242 located in the transmit path are passed to the antenna 225 for transmission to mobile stations of the CMRS system.

Each transmit branch network 242 is connected to one of the transmitters 255. A transmit branch network 242 filters transmit signals issued by a corresponding transmitter based on the frequency range assigned to that branch network. In this manner, each transmit branch network outputs a desired signal within a particular frequency range from the corresponding transmitter 255. For example, the first transmit branch network 242, which is directly connected to the isolator 230, filters a transmit signal within a particular frequency range and outputs that filtered signal to the upstream portion of the transmit path. In addition, this transmit branch network 242 also passes, to the isolator 230, all transmit signals output by the remaining transmit branch networks located in the downstream portion of the transmit path. Each remaining transmit branch network 242 preferably filters a transmit signal of a different frequency range based on the frequency range assigned to its transmitter. It will be appreciated that unique frequency ranges or blocks are assigned to separate transmit branch networks 242 to support the processing of transmission of signals within a specific frequency range by a corresponding transmitter 255.

Figure 3A:
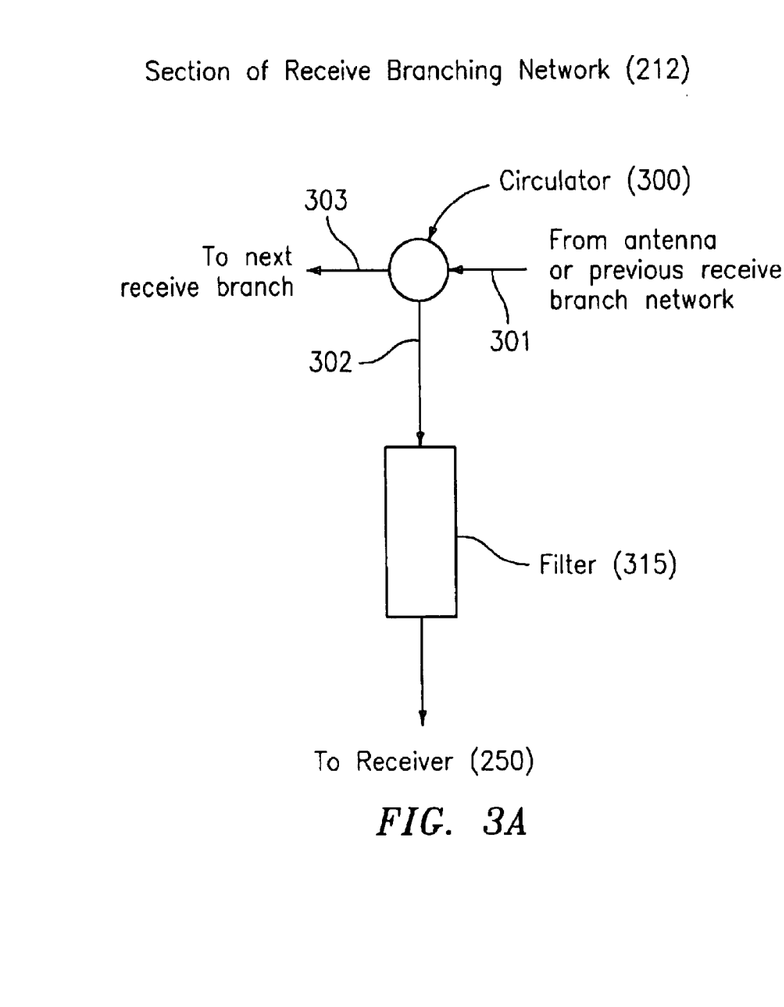
FIGS. 3A and 3B, collectively described as FIG. 3, are diagrams of exemplary receive and transmit branch networks respectively for the coupling system illustrated in FIG. 2.
Figure 3B:
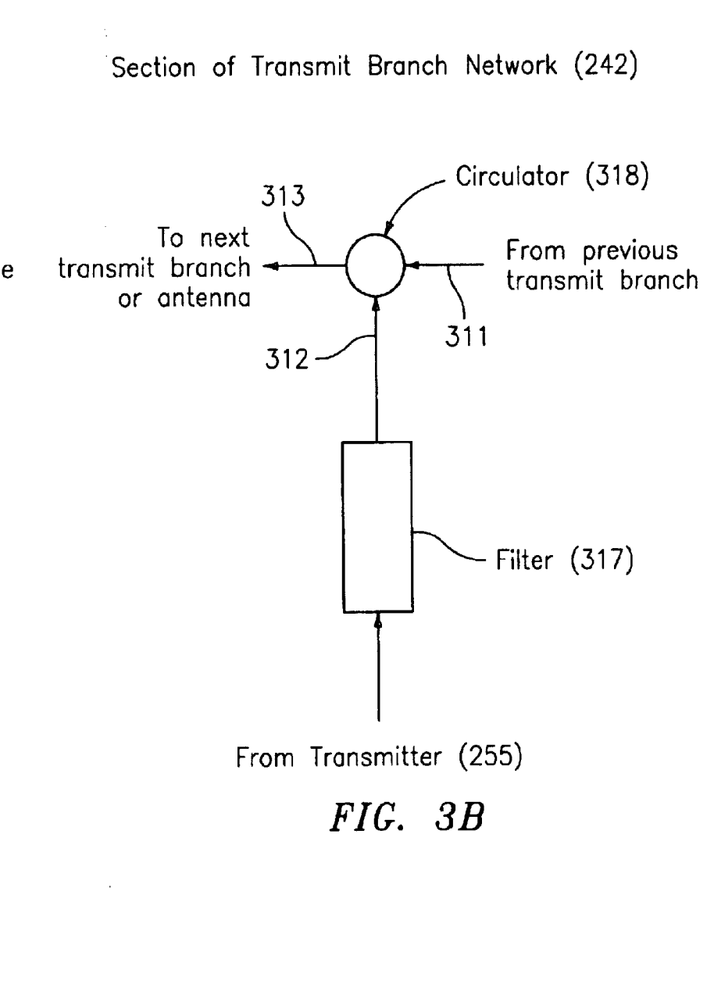

FIG. 3A illustrates a configuration for an exemplary section of a receive branch network and FIG. 3B illustrates an exemplary section of a transmit branch network. Each branch network, whether receive or transmit, preferably comprises a combination of a bandpass filter and ferrimagnetic circulator. Turning first to FIG. 3A, a representative receive branch network 212 comprises a filter 315 coupled to a circulator 300. This circulator comprises ports 301, 302 and 303. The opposite side of the filter is connected to one of the receivers 250, whereas the remaining ports (301 and 303) of the three-port circulator are connected to the receive path. For an exemplary receive branch, signals from the antenna 225 enter the circulator 300 at port 301 and are sent to the input of the filter 315 via port 302. The signals within the passband of filter 315 pass through to the receiver coupled to the filter 315. Specifically, the output signals of filter 315 form the input to the receiver 250. Those signals outside the passband of the filter 315 do not pass through, but are reflected back into port 302 of the circulator 300 and exit the circulator at port 303 to the next receive branch.

Turning now to FIG. 3B, a representative transmit branch network 242 comprises a filter 317 coupled to a circulator 318. The circulator 318 comprises three ports 311, 312, and 313. One side of the filter 317 is connected to the port 312 of the circulator 318. The opposite side of the filter 317 is connected to one of the transmitters 255, whereas the remaining ports (311, 313) of the three-port circulator are connected to the transmit path. For an exemplary transmit branch, signals originate from the transmitter 255 and are input to the filter 317. The filter 317 outputs a filtered version of the transmit signal to the circulator 318. The transmit signals, now filtered, enter the circulator at port 312 and are coupled with any signals that previously entered in port 311. The signals exit at port 313 and travel in the upstream direction along the transmit path for delivery to the antenna 225.

Figure 4A:
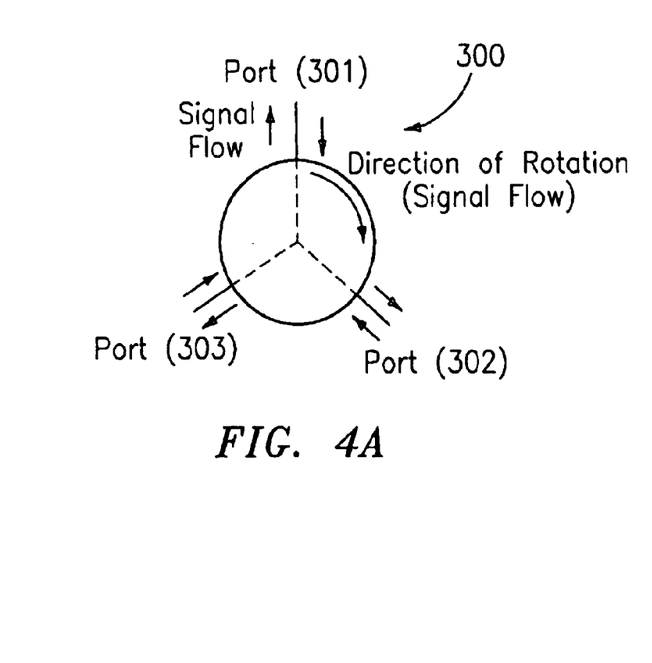
FIG. 4A is a diagram illustrating the typical signal flow of a circulator for use with the coupling system shown in FIG. 2.
Figure 4B:
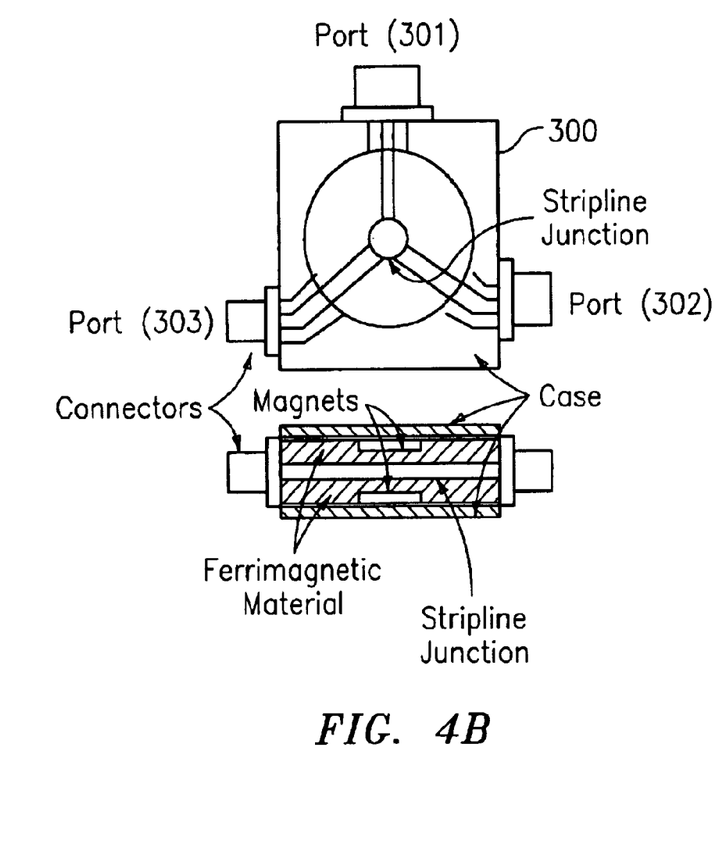
FIG. 4B is a diagram illustrating the typical construction of the circulator shown in FIG. 4A.

Turning now to FIGS. 4A and 4B, the circulator 300 (and circulator 318) is preferably implemented as a three-port ferrimagnetic circulator that exhibits unique signal flow characteristics and typical port-to-port losses of less than 0.3 dB. The circulator illustrated in FIG. 4B is typical of the type of circulators used in the UHF and low microwave frequency bands and incorporates a stripline junction. Two ferrite disks are set in between the case (ground plane) and the center metallic conductor (stripline). These ferrite disks form a single, low-order resonant mode cavity; however, when the ferrite material is energized with a magnetic field this mode breaks into two resonant modes with slightly different resonant frequencies. The operating frequency of the circulator can be chosen by specifying the type and physical size of the ferrite material.

Circulators typically include an arrow on the component's case indicating the direction of rotation or signal flow through the circulator. As shown in FIG. 4A, all energy entering the receive branch circulator 300 at port 301 will exit at port 302, all energy entering port 302 will exit at port 303 and all energy entering port 303 will exit at port 301. The port-to-port attenuation typically varies from 0.15 dB to 0.4 dB depending upon the circulator construction with representative values of less than 0.3 dB. If, at port 302 there is a mis-matched load, then some or all of the energy entering port 301 will be reflected in port 302 and will be sent to port 303 with little or no additional attenuation. This kind of phenomenon also occurs with an RF signal that is outside of a filter's passband. If port 302 is internally terminated with a mismatched load, the configuration is known as an isolator. Any energy that tries to flow against the circulator rotation will be attenuated by typically 20 dB per section.

Figures 5A, 5B, 5C, 5D, 5E:
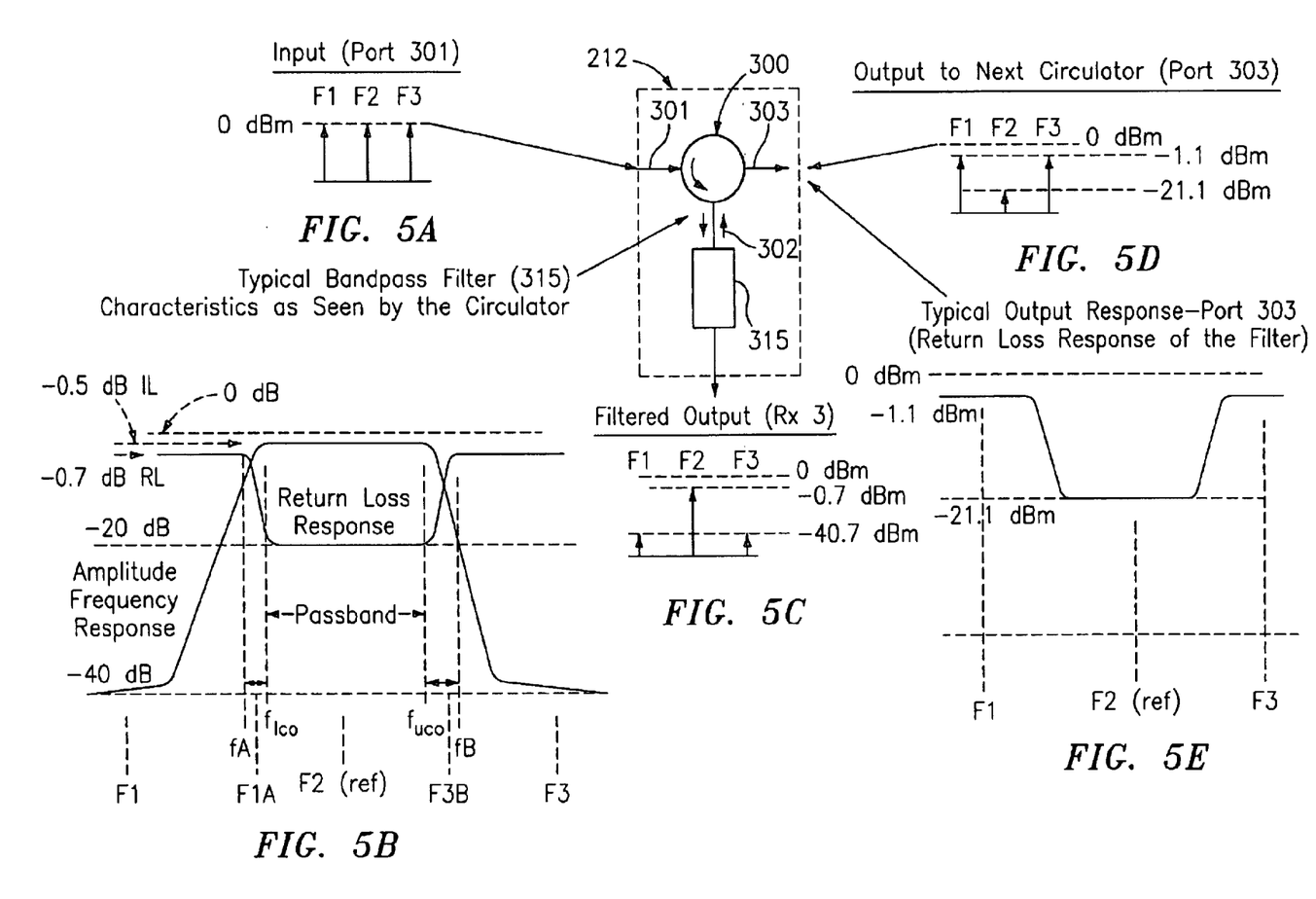
FIGS. 5A, 5B, 5C, 5D and 5E, collectively described as FIG. 5, are diagrams of the frequency response and signal levels for an exemplary branch network for the coupling system illustrated in FIG. 2.

FIGS. 5A–5E illustrate the signals present at the ports of a three-port circulator, such as the circulator 300, for a representative receive branch. As shown in FIG. 5A, three signals with frequencies F1, F2 and F3, all of equal amplitude, enter the circulator 300 at port 301. The signals pass through circulator 300 in the direction of rotation and appear at port 302. All signals exit at port 302. Because frequencies F1 and F3 are outside of the passband of filter 315, they are reflected back by the filter into port 302 with a loss equal to the return loss of filter 315 at frequencies F1 and F3, as illustrated in FIG. 5B. The F2 frequency will pass through the filter 315 as it is inside the filter's passband and signals F1 and F3 are attenuated, as shown in FIG. 5C. Because the filter does not present a perfect impedance match, some of the F2 signal is also reflected back into port 302 at an attenuated level. The three signals travel and exit at port 303, as shown in FIG. 5D, onto the next circulator of a receive branch or until the terminator 245 for the receive path is encountered.

Referring again to FIG. 5B, the filter 315 (and filter 317) allows passage of the appropriate receive (transmit) frequency signals associated with the respective receivers (transmitters). The filter 315, preferably implemented as a bandpass configuration, may be constructed as a ceramic filter, cavity filter, or other technology. Factors such as the power dissipation may determine the type of technology used to construct the filter. Bandpass filters typically have an insertion loss of less than 0.5 dB. There can be any number of branches configured in this system, as long as the operating frequency of the filter 315 is not repeated in any of the receive or transmit branches.

Bandpass filters typically exhibit two sets of characteristics, one set for "in-band" and another set for "out of band" performance. The important characteristics for filters used in the branching network are shown in Table II:

TABLE II

| | |
|---|---|
| (1) | In-Band: amplitude/frequency response, return loss response, and the delay and linearity response. |
| (2) | Out-of-Band: rejection (sharpness of the filter skirt), and return loss response. |

A brief description of the amplitude-frequency response and the return loss response characteristics assists in the understanding of how the filter 315 and the circulator 300 interact. The amplitude frequency response in FIG. 5B illustrates the typical bandpass filter characteristics, as seen by the circulator 300. The relative signal loss (amplitude-frequency response) over the band between the lower($f_{lco}$) and upper($f_{uco}$) cutoff frequencies is shown with respect to a reference frequency (F2). The smaller the relative loss (ripple), the flatter is the passband. The second characteristic is the out-of-band rejection. This characteristic measures the filter's ability to discriminate against signals that are close to, but outside of the passband. The steeper (more vertical) the filter skirt, the better the discrimination and the closer the frequency separation between the branch sections can be for the same out of band rejection specification. This improved rejection does not come without a price, which is increased insertion loss and amplitude ripple inside the passband.

The primary filter characteristic that allows it to be used in a branching network configuration is the return loss response. This parameter indicates how well the filter performs with the circulator and it determines the signal loss as it passes through the circulator/filter combination to the next circulator. Specifically, the return loss response measures the change in the filter's characteristic impedance across a span of frequencies with respect to the designed passband characteristic impedance. This span of frequencies (F1 to F3) generally includes both the out-of-band and the in-band portions of the filter. The return loss response is inversely related to the amplitude response. FIG. 5E shows the amplitude-frequency response (F1, F2 and F3) at port 303 due to the filter 315/circulator 300 interaction.

The velocity of propagation of any RF signal that passes through a medium will be slowed down. If the RF signal is wideband and the medium is not uniform across the band, a portion of that signal will be slowed down more than another portion and result in distortion. Delay and linearity, or more appropriately, differential phase and differential gain are measurements of a device's ability to pass a wideband signal without detrimental distortion. Differential phase, expressed in degrees, is a measure of the rate of change in the phase angle of the leading edge of a modulated test tone as the signal is swept across the passband of the device under test. Similarly, differential gain, expressed in percent, is a measure of the rate of change of the modulated test tone signal's voltage (amplitude) as it is swept across the band.

These two parameters and the amplitude ripple determine whether the recovered signal can be successfully demodulated and decoded after it has passed through a non-linear (filter/circulator) device. These parameters are mentioned here to identify the need to consider these specifications when designing the components used in the branching network and selecting the frequency spacing.

The concept for combining or splitting certain signals works well when the signals, such as F1 and F3 of FIG. 5B, are widely spaced. However, when these carriers are closer together, e.g., in the F1A and F3B regions of FIG. 5B, the signals fall on the knee, or slope, of the return loss curve and are only partially reflected. The partial reflection causes greater loss and possible distortion as the signals pass through the branching network.

Unlike microwave radio systems operating in the lower microwave frequency ranges, PCS channel spacing is usually less than 1 MHz between adjacent channels and places stringent requirements on the filter. Furthermore, if a PCS base station is tuned to a different frequency block or sub-block, a change in the operating frequency of the filters is required. Rather than replace the filters of the branch networks, tunable filters can be utilized to provide flexibility in adapting receive and transmit branches to different frequency operation.

It will be understood that a coupling system using branching networks properly operates if each branch has a different operating frequency (passband). The advantages of the system over conventional methods is demonstrated if there is more than one transmitter and receiver per branch, as shown in FIG. 2. A typical application would be to divide a PCS frequency block up into 3 or more (filtered) sub-band blocks. The number of block filters would depend upon the technology and the frequency plan being implemented.

Unlike the use of traditional technology, i.e., couplers and duplexors, which pass wideband signals, transmission and reception of signals in the antenna branching network is limited to the frequencies of the branching network's bandpass filters. PCS systems may change the frequencies being used (called frequency hopping) as long as the hopping is restricted to frequencies (channels) inside the passband of the branching filter. These channels must be contiguous channels within the frequency block. The number of channels required within the block depends upon the technology and the frequency hopping scheme deployed.

The use of the antenna branching network provides various advantages. First, signal filtering occurs prior to receiver processing, resulting in a potential gain of 6 dB in the carrier to noise ratio. The same filtering also benefits signal reception by rejecting adjacent block signals as well as spurious signals from the transmitters. Furthermore, the circulator and filter components exhibit a lower overall transmission loss from the transmitter compared to current technologies. Lastly, the overall noise floor improvement in the system compared to current technologies improves communication with mobile subscribers.

It will be appreciated by those skilled in the art that the branch networks for the embodiments of FIGS. 2 and 3 can be combined in numerous other ways than as illustrated. For example, an exemplary antenna coupling system can comprise only a pair of transmitters/receivers. The inventive technology also can be applied to cellular systems with the appropriate change in operational frequency aspects of the various components. Those skilled in the art that alternative adaptations and combinations of the components of the branch networks are possible and within the scope of the present invention.

The technology of the present invention relies on devices designed to manipulate electromagnetic signals based on their wavelengths. The physical size of these devices are physically inversely proportional to the frequency at which they operate. Because this PCS frequency spectrum comprises a higher frequency range than the frequency spectrum allocated to cellular, the components for a PCS-compatible embodiment are relatively small. The same components designed for cellular, would be much larger. Thus, it is feasible to use such technology for PCS, whereas it may be less practical for cellular.

The foregoing relates to the preferred embodiment of the present invention, and many changes may be made therein without departing from the scope of the invention as defined by the following claims.

What is claimed is:

1. A system for coupling a base station transmitter and a base station receiver to an antenna for a commercial mobile radio service (CMRS) system, comprising:

an antenna for radiating transmit signals to and receiving receive signals from mobile radio stations of a CMRS system;

a plurality of receive branch networks, coupled to the antenna via a receive path and to the base receiver, each operative to select a frequency range of the receive signals for reception by the base station receiver and to pass the receive signals for processing by the remaining receive branch networks located in a downstream portion of the receive path;

a plurality of transmit branch networks, coupled to the antenna via a transmit path and to the base transmitter; each operative to select a frequency portion of the transmit signals transmitted by the base transmitter for forwarding to the antenna and to accept all transmit signals forwarded by the remaining transmit branch networks in a downstream portion of the transmit path for forwarding to the antenna;

a bandpass filter, coupled between the antenna and the receive path, for passing receive signals within a predetermined frequency range from the antenna circulator to the receive path while preventing the passage of transmit signals from the circulator to the receiver path; and an isolator, coupled between the antenna and the transmit path, for passing transmit signals to the antenna circulator from the transmit path while preventing the passage of receive signals from the antenna to the transmit path;

wherein each receive branch network includes a receive filter passing a block of frequencies to a base receiver, the block of frequencies corresponding to hopping channels inside a passband of said receive filter; said hopping channels used to change a frequency of communication between a mobile station and said base station receiver.

2. The system of claim 1, wherein each receive branch network comprises:

a circulator, comprising a first port and a third port coupled to the receive path and a second port, operative to accept receive signals from an upstream portion of the receive path via the first port, to pass the receive signals via the second port to the third port and to the remaining receive branch networks located in the downstream portion of the receive path, and to output the receive signals via the second port; and said receive filter being coupled between the second port of the circulator and the base receiver, operative to accept the receive signals from the second port of the circulator and to select the frequency range of the receive signals for processing by the base receiver.

3. The system of claim 1, wherein each transmit branch network comprises:

a filter, coupled to the base transmitter, operative to output filtered transmit signals in response to select the frequency portion of the transmit signal generated by the base transmitter;

and a circulator, comprising a first port and a third port coupled to the transmit path and a second port coupled to the filter, operative to accept at the second port the filtered transmit signals for forwarding via the third port to an upstream portion of the transmit path and to accept at the first port the transmit signals output by remaining transmit branch networks located in the downstream portion of the transmit path for forwarding via the third port to the upstream portion of the transmit path.

4. The system of claim 1 further comprising an antenna circulator, coupled between the receive and transmit paths and to the antenna, for directing receive signals from the antenna to the receive path and transmit signals from the transmit path to the antenna.

5. The system of claim 1, wherein the base receiver comprises a plurality of channel receivers, each allocated a unique frequency range and coupled to one of the receive branch networks for processing receive signals within the unique frequency range.

6. The system of claim 1, wherein the base transmitter comprises a plurality of transmitters, each allocated a unique frequency range and coupled to one of the transmit branch networks for generating transmit signals within the unique frequency range.

7. The system of claim 2, wherein the filter of each receive branch network comprises a filtering characteristic selected from the group of bandpass, highpass and lowpass filter characteristics.

8. The system of claim 1, wherein the number of receive branch networks is not equal to the number of transmit branch networks.

9. The system of claim 3, wherein the filter of each transmit branch network comprises a filtering characteristic selected from the group of bandpass, highpass and lowpass filter characteristics.

10. A method for coupling a base station transmitter and a base station receiver to an antenna for a commercial mobile radio service (CMRS) system, the antenna coupled to a receive path comprising receive branch networks for processing receive signals and to a transmit path comprising transmit branch networks for processing transmit signals, comprising:

at each of the receive branch networks, selecting a frequency range of receive signals for reception by one of the base station receivers and passing the receive signals to the receive branch networks located in a downstream portion of the receive path for processing by the remaining base station receivers, wherein the frequency range corresponds to a block of frequencies, the block of frequencies corresponding to hopping channels, said hopping channels used to change a frequency of communication between a mobile station and said base station receiver;

at each of the transmit branch networks, selecting a frequency portion of transmit signal transmitted by one of the base transmitters for forwarding to the antenna and accepting all transmit signals forwarded by the remaining transmit branch networks located in a downstream portion of the transmit path for forwarding to the antenna;

at the receive path, passing receive signals to the receive path from the antenna while preventing passage of transmit signals to the receive paths; and at the transmit path, passing transmit signals to the antenna from the transmit path while preventing passage of receive signals to the transmit path.

11. A system for coupling a base station transmitter and a base station receiver to an antenna for a commercial mobile radio service (CMRS) system, comprising:

an antenna for radiating transmit signals to and receiving receive signals from mobile radio stations of a CMRS system;

a plurality of receive branch networks, coupled to the antenna via a receive path and to the base receiver, each comprising:

a circulator, comprising a first port and a third port coupled to the receive path and a second port, operative to accept receive signals from an upstream portion of the receive path via the first port, to pass the receive signals via the second port to the third port and to the remaining receive branch networks located in the downstream portion of the receive path, and to output the receive signals via the second port, and a filter, coupled between the second port of the circulator and the base receiver, operative to accept the receive signals from the second port of the circulator and to select a frequency range of the receive signals for processing by the base receiver; and a plurality of transmit branch networks, coupled to the antenna via a transmit path and to the base transmitter, each comprising:

a filter, coupled to the base transmitter, operative to output filtered transmit signals in response to selecting a frequency portion of the transmit signal generated by the base transmitter, and a circulator, comprising a first port and a third port coupled to the transmit path and a second port coupled to the filter, operative to accept at the second port the filtered transmit signals for forwarding via the third port to an upstream portion of the transmit path and to accept at the first port the transmit signals output by remaining transmit branch networks located in the downstream portion of the transmit path for forwarding via the third port to the upstream portion of the transmit path;

wherein each receive branch network includes a receive filter passing a block of frequencies to a base receiver, the block of frequencies corresponding to hopping channels inside a passband of said receive filter; said hopping channels used to change a frequency of communication between a mobile station and said base station receiver.

12. The system of claim 11 further comprising an antenna circulator, coupled between the receive and transmit paths and to the antenna, for directing receive signals from the antenna to the receive path and transmit signals from the transmit path to the antenna.

13. The system of claim 11, wherein the base receiver comprises a plurality of channel receivers, each allocated a unique frequency range and coupled to one of the receive branch networks for processing receive signals within the unique frequency range; and the base transmitter comprises a plurality of transmitters, each allocated a unique frequency range and couple to one of the transmit branch networks for generating transmit signals within the unique frequency range.

14. The system of claim 11, wherein the number of receive branch networks are equal to the number of transmit branch networks.

15. The system of claim 11, wherein the number of receive branch networks are not equal to the number of transmit branch networks.

* * * * *